Figure 1:
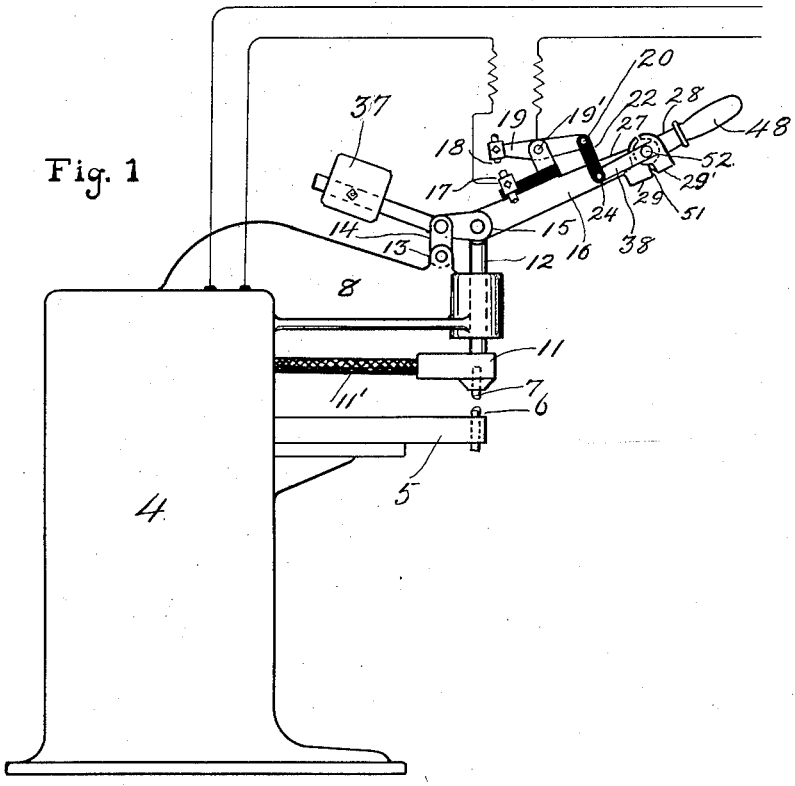

A. C. TAYLOR.
ELECTRIC WELDING MACHINE.
APPLICATION FILED JULY 20, 1911.

1,021,732.

Patented Mar. 26, 1912.
3 SHEETS—SHEET 1.

Witnesses
Q. Renfle
J. P. Cole

Inventor
Albertis C. Taylor
By George W. Upton
Attorney

A. C. TAYLOR.
ELECTRIC WELDING MACHINE.
APPLICATION FILED JULY 20, 1911.

1,021,732.

Patented Mar. 26, 1912.
3 SHEETS—SHEET 2.

Witnesses:
J. B. Cole.
R. Renftle.

Inventor.
Albertis C. Taylor.
By George W. Upton,
Attorney.

A. C. TAYLOR.
ELECTRIC WELDING MACHINE.
APPLICATION FILED JULY 20, 1911.

1,021,732.

Patented Mar. 26, 1912.

3 SHEETS—SHEET 3.

Witnesses
A. Renftle
J. B. Cole.

Inventor
Albertis C. Taylor
By George W. Upton
Attorney

UNITED STATES PATENT OFFICE.

ALBERTIS C. TAYLOR, OF WARREN, OHIO, ASSIGNOR TO THE NATIONAL ELECTRIC WELDER COMPANY, OF WARREN, OHIO, A CORPORATION OF OHIO.

ELECTRIC WELDING-MACHINE.

1,021,732.     Specification of Letters Patent.     Patented Mar. 26, 1912.

Application filed July 20, 1911. Serial No. 639,492.

*To all whom it may concern:*

Be it known that I, ALBERTIS C. TAYLOR, a citizen of the United States, residing at Warren, in the county of Trumbull and State of Ohio, have invented certain new and useful Improvements in Electric Welding-Machines, of which the following is a specification.

My invention relates to machines for welding metals by the heat of an electric current and is especially useful for spot welding although it is readily adapted for use on many forms of butt and other welding machines; and the objects of my improvement are, first, to prevent the heating of the metal about the spot where two pieces of metal are to be united before the electrodes are brought to their proper positions; second, to bring the electrodes in contact with the metal that is to be welded before the current is passed through them, third, to bring the electrodes to their proper position and to then apply the current by a single operation; and, fourth to prevent the possibility of spoiling the pieces of metal that are to be welded by carlessness or inefficiency of the operator, and consequently to prevent loss of time and material.

In spot welding whereby two pieces of metal are united by welding a series of spots or points adjacent to each other, two pointed copper electrodes are positioned opposite each other with space between for the edges or surfaces of the pieces to be welded, either lapped on or butted against each other.

If the circuit is closed by bringing the connecting blocks together so that the current passes through the electrodes before they actually contact with the metals to be welded, so great a heat is produced as will melt said metals and distort or scar them, and spoil the union thereof.

Prior to the invention of my improvement the operator brought the electrodes into contact with the metals to be welded by one manual operation and then closed the circuit through them by a second operation; and it is not impossible, but is of frequent occurrence for the operator to reverse said operations and burn the metals instead of welding them, as above explained.

My invention makes it impossible to reverse said operations, and makes the proper positioning of the electrodes a necessity before the current can be passed through them by bringing the contact blocks together.

I attain the objects set forth by the mechanism illustrated in the accompanying drawings, in which:—

Figure 5:
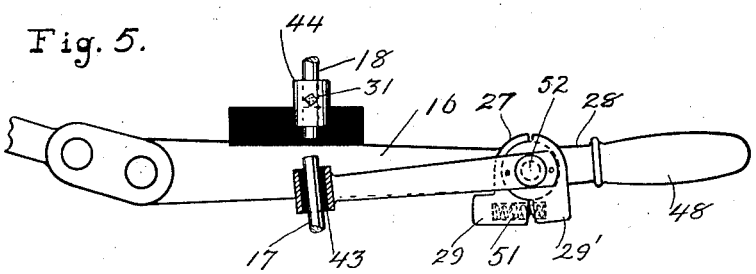
Figure 3:
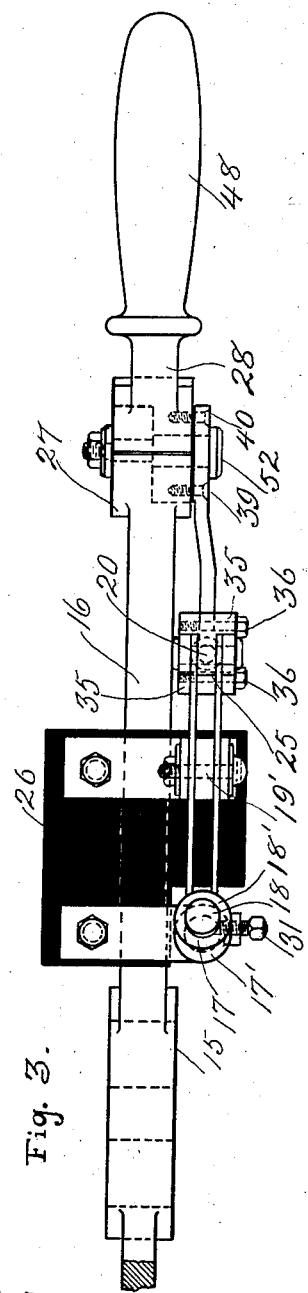
Figure 2:
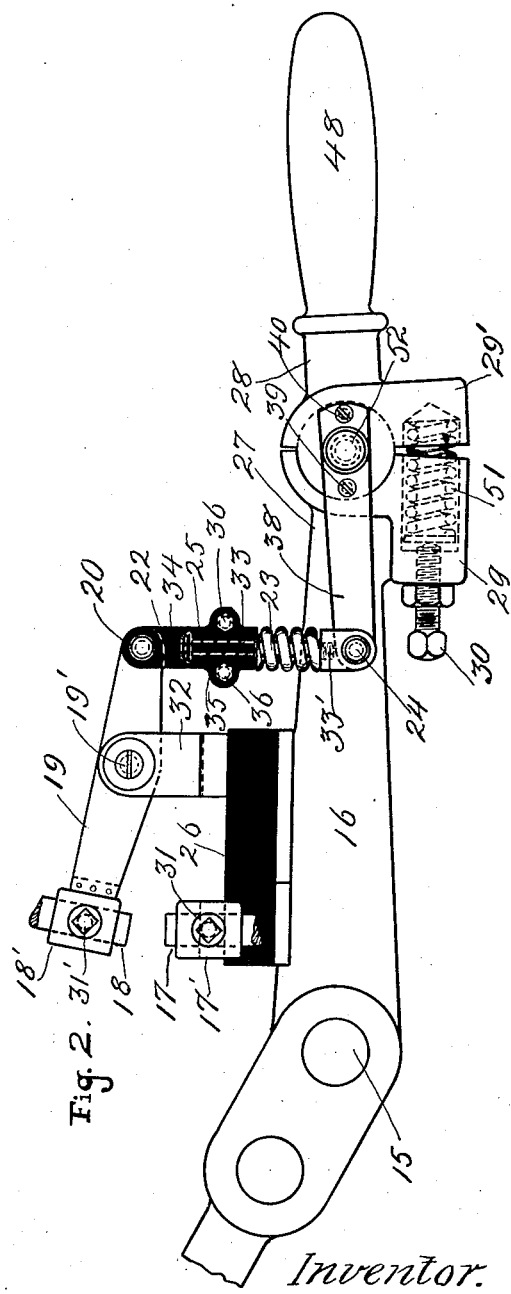
Figure 4:
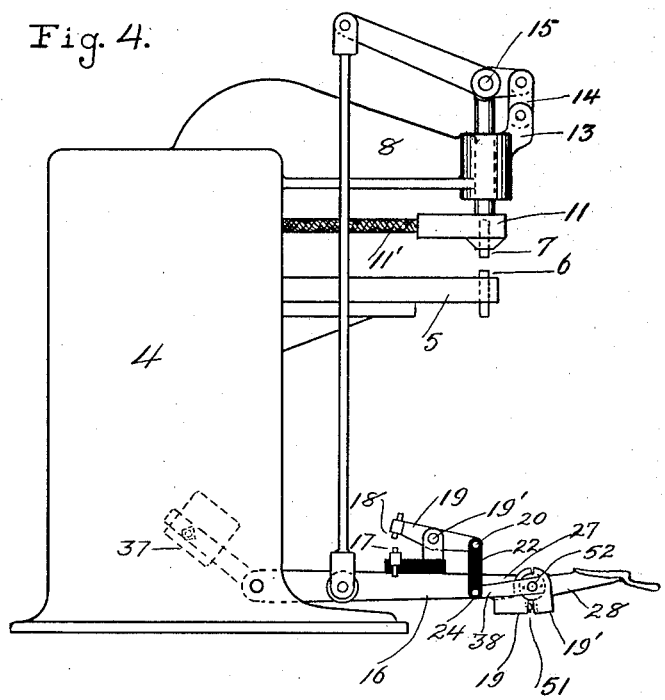

Figure 1 is an elevation more or less diagrammatic, of a spot welding machine provided with my improvements; Fig. 2 is an enlarged elevation of the controlling lever, with parts broken away; Fig. 3 is a plan of the same; Fig. 4 shows my improvement adapted for use with a treadle, and Fig. 5 shows a modification.

Similar characters refer to similar parts throughout the several views.

4 is the base of the machine in which a transformer may be placed; 5 is an arm projecting from base 4 to support the lower electrode 6, and conduct the secondary current thereto.

7 is the upper electrode supported by a head 11 to which a set of wires 11', connecting with the transformer, are attached.

8 is a supporting arm leading from the base 4, and loosely supports a rod 12 attached to a head 11, and the upper electrode 7.

To an ear 13 of the arm 8 is pivoted a link 14 to which is fulcrumed the lever 16, upon one arm of which is a counter balance weight 37, while the outer end of the other arm has a handle 48.

The rod 12 of the upper electrode is pivoted to the lever at the axle 15.

When the handle 48 is brought down by the operator, the electrode 7 carried by the rod 12 which is pivoted to the lever 16 at the axle 15, is brought into contact with the lower electrode 6, or the metals between them, a spot or point in each of which is to be welded to a corresponding spot or point in the other.

Prior to the meeting of the electrodes 6 and 7, or the contact of both of them, each with the corresponding piece of metal to be welded, the circuit can not possibly be closed and no current can pass through them; hence the metal between said electrodes is retained cold and uninjured.

Supported by the lever 16 is a bar 26, preferably of slate, bearing a head 17' in which a contact block 17, is held by a suitable set screw, 31, or other clamp; and a post 32, is also seated on said bar 26 and has a journal 19' in which is fulcrumed a rocking arm 19 which has a head 18' holding a second contact block 18, retained by a set screw 31'.

The arm 19 is hinged to an upright 22 at the pivot 20 and the latter is hinged to the extension arm 38, at the pivot 24. The upright 22 consists of a metal rod 33 with a head 34 and a collar 25 surrounding said rod 33, and impinging against the lower face of head 34. The collar 25 is a non conductor, preferably of fiber or its equivalent. Outside of said collar 25 we place, on either side, metal binders, 35, with bolts 36 binding the parts together.

23 is a spiral spring surrounding the rod 33 and is seated between the foot 33' of the rod 33 and the collar 25.

The long arm of lever 16 is formed in two sections 27 and 28, bearing jaws 29 and 29' and both rocking on a common axle of fulcrum 52, and each having a cavity for the reception of a pushing spring 51, the tension of which spring can be regulated by a screw 30 in either of said jaws, but which is shown as screwed into the jaw 29.

The extension arm 38 is rigidly attached at two points on opposite sides of the fulcrum 32 to an overlapping part of the lower section 28, by pins 39 and 40.

In practice the operator seizes the handle 48 and bears down on it; whereupon it rocks on the link 14, pushes down the rod 12 and the electrode 7 until the latter contacts with the metal between said electrodes. The current is still unclosed. By continuing the downward pressure on the lever handle 48 the jaw 29' of one lever section is pressed toward the jaw 29 of the other lever section, compressing the spring 51, and the extension arm 38 is canted so that an upward movement is given its end at the journal 24. As a consequence the upright 22 is elevated, the head 18' is lowered and the contact blocks 18 and 17 are brought together closing the circuit, which heats the metal between the electrodes and welds a spot thereof.

It will be seen that the pressure of the spring 51 separating the jaws 29 and 29' makes it absolutely impossible for the operator by negligence, accident or design to close the circuit before the electrodes have been brought together.

If the contact blocks 17 and 18 become elongated or shortened by heat the spring 23 compensates the difference and renders them equally effective. A greater or less pull on the handle 48 can be arranged for by adjusting screw 30.

I have shown a preferred way for uniting the sections 27 and 28, but any form of hinge would be within my invention, and the jaws equally as well be placed above the fulcrum 52 and a like result be produced by the use of a pulling spring instead of a pushing spring 51; and, for some of the lighter and cheaper types of welding machines, the modification shown in Fig. 5 can be used without departing from my invention. According to the arrangement there shown I employ insulations 43 and 44 for the contact blocks 17 and 18, and omit the arm 19 and upright 22 and the parts associated with them, as being unnecessary.

In Fig. 4 I have shown my invention adapted for operation by foot pressure; the free end of the long arm of the lever 16 having the form of a treadle instead of a handle. This arrangement is convenient in certain types of welding machines.

I claim:—

1. A lever for bringing the points of the electrodes of a welding machine together prior to closing the circuit and subsequently closing the circuit by a continuance of the same movement, as set forth.

2. In an electric welding machine a lever fulcrumed on said machine: one end actuating one of the welding electrodes and the other end composed of two sections pivotally attached to each other and each bearing jaws normally held open by a spring, as shown and described.

3. In a spot welding machine a lever composed of two sections for operating one of the electrodes; a spring for holding said sections in the same line until the electrodes contact with the metal between them; an extension arm attached to one of said sections and operating a second lever arm to close the circuit upon compression of said spring.

4. In an electric welding machine, the combination of an electrode, a lever connected thereto, said lever being composed of two sections with a knuckle joint between them, a spring for holding said joint open until said electrode closes on the metal to be welded, a circuit controller, and an arm attached to one section of said lever and operated thereby to close the circuit through the controller.

5. In an electric welding machine the combination of a pair of electrodes; a jointed lever to bring them together; a compression spring normally holding the members of said lever in a right line; an extension arm attached to one of said members and operating as part of it; and circuit closing contact blocks insulated from said lever and brought together by the operation of said extension arm, as set forth and described.

6. In an electric welding machine a jointed lever having a spring to extend its joints so that the lever acts as a whole to force the electrodes together, and, by a continuance of the same motion, thereafter compresses said spring and unites two circuit closing contact blocks, one carried by each of said jointed members of said lever, as shown and described.

7. In a lever of the kind described, between the lever arm 19 bearing the contact block 18 and the extension arm 38, a headed rod 33 surrounded by an insulating collar 25 and a compensating spring 23, for the purpose set forth.

8. In an electric welding machine, an electrode for engaging the work, means for controlling the circuit, and a manually-operable element movable on a substantially fixed plane for first moving said electrode to engage the work and then on further movement to cut in the circuit through the controlling means.

9. In an electric welding machine, an electrode for engaging the work, a circuit closer, and a lever connected both to the electrode and the circuit closer, the connection between the circuit closer and the lever permitting the circuit to be closed only after the electrode has been moved into position to engage the work, said electrode and circuit closer being successively operated by the movement of the lever on a substantially fixed plane.

10. In an electric welding machine, an electrode for engaging the work, a circuit closer, a lever movable on a substantially fixed plane for first moving said electrode to engage the work, and means carried by the lever for closing the circuit through said closer on the further travel of the lever after the electrode is moved into work-engaging position.

11. In an electric welding machine, an electrode for engaging the work, a circuit closer, and a sectional lever, the sections of which respectively control the electrode and the circuit closer, said lever being movable on a substantially fixed plane to first move the electrode to engage the work and then close the circuit through the closer.

12. In an electric welding machine, an electrode for engaging the work, a circuit closer, a sectional lever, the sections of which respectively control the electrode and the circuit closer, and a spring interposed between said sections, the tension of said spring being overcome to close the circuit only after the electrode has been moved into work-engaging position.

13. In an electric welding machine, an electrode for engaging the work, a circuit closer, a lever having one of its arms formed in two parts pivotally connected together, a spring interposed between said parts, one of said parts being connected to the electrode, and means carried by the other part and connected to the circuit closer, the tension of said spring being overcome to close the circuit only after the lever has been moved to place the electrode in work-engaging position.

14. In an electric welding machine, an electrode for engaging the work, a lever having two pivotally connected sections, a spring interposed between said sections, said electrode being connected to one of said lever-sections, a circuit-closer, and a connection between the latter and the other of said lever-sections, said circuit closer being capable of closing the circuit only when the tension of said spring is overcome, and said spring being overcome only after the electrode carried by the lever is moved into work-engaging position.

15. In an electric welding machine, an electrode for engaging the work, a lever for moving said electrode, said lever having a pivoted section, a spring normally holding said section in fixed position, a circuit closer having a movable member, and a connection between said movable member and said pivoted section, said connection being moved to actuate the closer when the spring is overcome after the electrode is in work-engaging position.

16. In an electric welding machine, an electrode for engaging the work, a lever for moving said electrode, said lever having a pivoted section, a spring normally holding said section in fixed position, a circuit closer having a movable member, a pivoted member for said movable member, a fixed part carried by said pivoted section, and a connection between said pivoted member and fixed part, which latter may be actuated to close the circuit only after the electrode is in work-engaging position.

In testimony whereof I affix my signature in presence of two witnesses.

ALBERTIS C. TAYLOR.

Witnesses:
 J. B. COLE,
 R. RENFTLE.